United States Patent [19]

Jung et al.

[11] Patent Number: 5,974,491
[45] Date of Patent: Oct. 26, 1999

[54] HIGH SPEED DATA TRANSFER APPARATUS FOR DUPLEXING SYSTEM

[75] Inventors: Woo-Sug Jung, Seoul; Ho-Geun Lee, Daejeon; Hwan-Geun Yeo, Daejeon; Kwang-Sug Song, Daejeon, all of Rep. of Korea

[73] Assignees: Electronics and Telecommunications Research Institute, Daejon; Korea Telecom, Seoul, both of Rep. of Korea

[21] Appl. No.: 08/824,035

[22] Filed: Mar. 26, 1997

[30] Foreign Application Priority Data

Oct. 5, 1996 [KR] Rep. of Korea ............... 96-44145

[51] Int. Cl.$^6$ .................. G06F 13/00; H04L 1/00
[52] U.S. Cl. .............. 710/106; 710/31; 714/43; 370/278
[58] Field of Search .................. 370/217, 219, 370/220, 437, 438, 439, 442, 395, 278; 710/106, 33, 262, 31; 709/300; 714/3, 11, 55, 56, 43; 713/323; 712/208

[56] References Cited

U.S. PATENT DOCUMENTS

| | | |
|---|---|---|
| 5,251,299 | 10/1993 | Masuda et al. .................. 395/200 |
| 5,261,047 | 11/1993 | Rivshin .................. 395/163 |
| 5,274,633 | 12/1993 | Kato et al. .................. 370/219 |
| 5,301,184 | 4/1994 | Uriu et al. .................. 370/219 |
| 5,541,962 | 7/1996 | Yoshino .................. 375/354 |
| 5,805,592 | 9/1998 | Hatano .................. 370/395 |

FOREIGN PATENT DOCUMENTS

0 651 579 A1  5/1995  European Pat. Off. .

*Primary Examiner*—Gopal C. Ray
*Attorney, Agent, or Firm*—Cohen, Pontani, Lieberman & Pavane

[57] ABSTRACT

A high speed data transfer apparatus includes a data transfer controlling unit for outputting a signal to the standby mode system during the active mode system, and during the standby mode system, reading data and the data information stored in the second storing unit of the active mode system, storing the read contents in the second storing unit of the standby mode system, and transferring a right to a bus use through the local bus of the standby mode system, the signal being used for informing that there exists data to be transferred.

9 Claims, 7 Drawing Sheets

HIGH SPEED DATA TRANSFER APPARATUS FOR DUPLEXING SYSTEM

BACKGROUND OF THE INVENTION

1. Field of the Invention

The present invention relates to a high speed data transfer apparatus for duplexing in an ATM (Asynchronous Transfer Mode) switching system.

2. Discussion of Related Art

In general, there should be provided a fault tolerance function and a real time process function in the electronic switching system, unlike conventional computer systems. Further, reliability and solubility are very necessary to the electronic switching system a down time of which should be less several minutes for 1 year. The solubility means a possibility of permitting the system to normally perform its original operation at any time. And, the fault tolerance function of the system is subjected to employ a duplex method. The duplex method is composed of the same systems, one of which is an active mode system and the other of which is a standby mode system. Therefore, under use, if a fault is found in the active mode system, the standby mode system is employed to perform a series of operations which have been executed by the active mode system. As a result, the duplex method does not permit the system to have such a fault.

Figure 1:
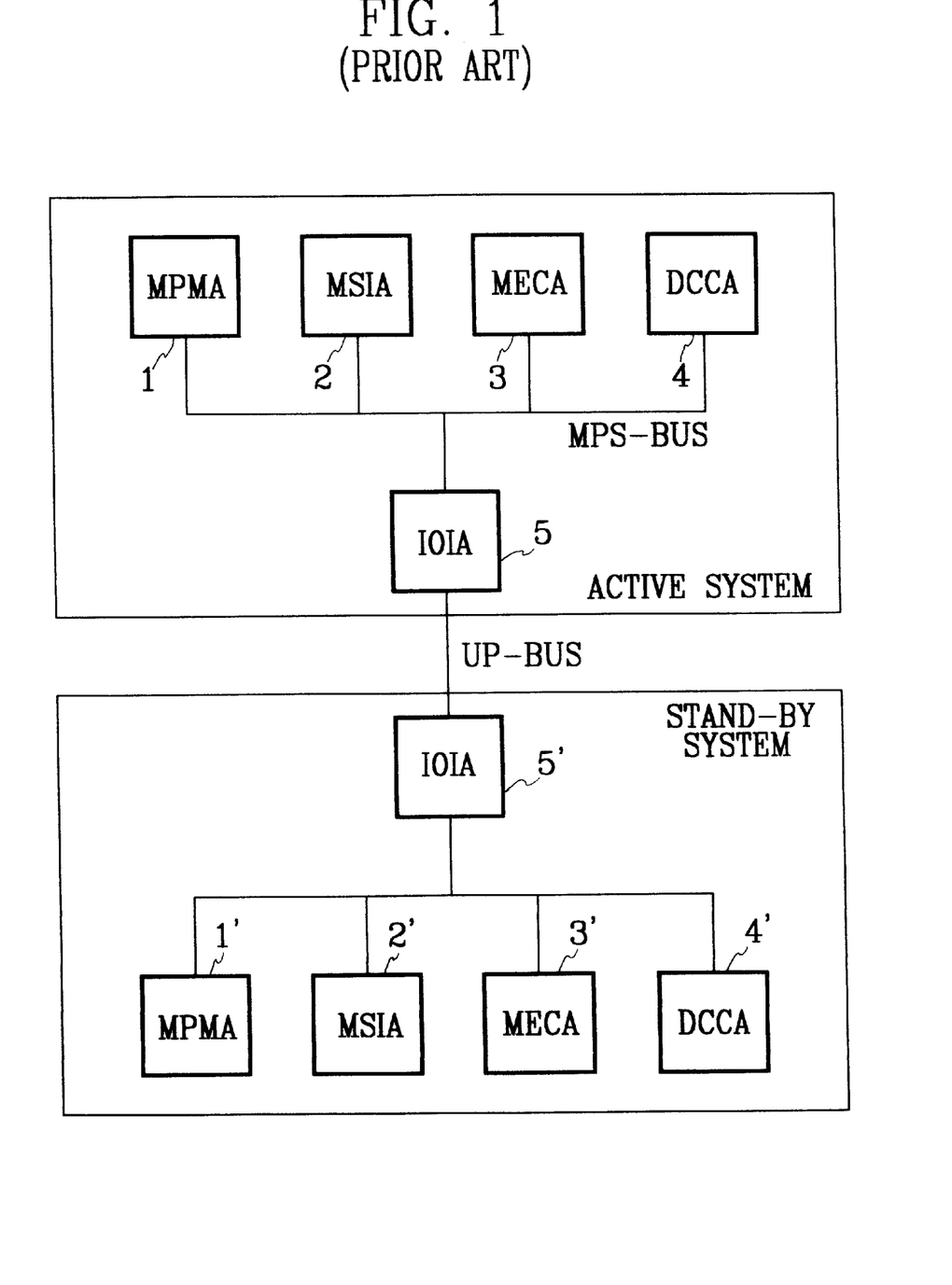
FIG. 1 is a schematic construction diagram of a high speed data transfer channel in an electronic switching system according to the prior art.

FIG. 1 is a schematic construction diagram of a high speed data transfer channel capable of performing a concurrent writing in an electronic switching system TDX-10 according to the prior art.

Referring to FIG. 1, active/standby mode systems are shown therein and only the system which is under operation can be the active mode system. After the system is determined as the active or the standby mode system, only the processor of the active mode system can access resources of the standby mode system.

Main processor and memory management board assemblies 1 and 1' (hereinafter, called them MPMA) are used as main processors having the CPU (central processing unit) and a memory. Mass storage interface board assemblies 2 and 2' (hereinafter, called them MSIA) are used for managing auxiliary storage units like disk and MT. I/O interface board assemblies 5 and 5' (hereinafter, called them IOIA) are used as a kind of multiplexer to manage an input/output interface. Memory and error correction board assemblies 3 and 3' (hereinafter, called them MECA) are used as memory expansion boards. Duplication control channel board assemblies 4 and 4' (hereinafter, called them DCCA) are used for providing the high speed data transfer channel between the duplex processors.

The Duplex modes, i.e., the active and standby mode systems are subjected to each having their power and their buses separated from each other. And, in their operations, when the MPMA 1 of the active mode system writes data in its own local memory or the MECA 3, the high speed data transfer channel of the TDX-10 permits the DCCA board 4 of the active mode system to write corresponding data in the MECA 3' or the MPMA 1' of the standby mode system through the high speed data transfer channel UP-bus.

At this time, a response to the writing operation in the active mode system is delayed until another response is received from the standby mode system. Thereby, the high speed data transfer channel of the TDX-10 can not perform the next operation until one writing operation is completed in the standby mode system and its response is then received. This has caused reduction in the system's capability.

SUMMARY OF THE INVENTION

Accordingly, the present invention is directed to a transfer apparatus capable of concurrently writing data even in a memory of a standby mode system, in case of writing the data in a memory of an active mode system, by separating an operation of a local bus of the active mode system from a writing operation in a local memory of the standby mode system through the high speed data transfer channel.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve this advantage in accordance with the purpose of the present invention, as embodied and broadly described, the high speed data transfer apparatus of the present invention comprises a bus monitoring unit for decoding an address stored in a local bus and outputting a signal to access data stored in an internal register and a control signal to buffer input data; a first storing unit for storing a cause of an interruption generation, duplex mode determining data, and an address of the data to be transferred, the first storing unit being controlled by the bus monitoring unit; a second storing unit for storing data and state information of the data input from the local bus under control of the bus monitoring unit during an active mode system, and temporarily storing data transferred from the active mode system during a standby mode system; a data transfer controlling unit for outputting a signal to the standby mode system during the active mode system, and during the standby mode system, reading data and the data information stored in the second storing unit of the active mode system, storing the read contents in the second storing unit of the standby mode system, and transferring a right to a bus use through the local bus of the standby mode system, the signal being used for informing that there exists data to be transferred; a channel controlling unit for determining a transfer direction of the bus according to the duplex mode, and controlling the bus so as to disconnect a transfer channel when error is found; and a bus request controlling unit for requesting the right to local bus use under control of the data transfer controlling unit.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

DETAILED DESCRIPTION OF THE PRESENTLY PREFERRED EMBODIMENTS

Reference will now be made in detail to the preferred embodiments of the present invention, examples of which are illustrated in the accompanying drawings.

It will be apparent to those skilled in the art that various modifications and variations can be made in a high speed data transfer apparatus of the present invention without departing from the spirit or scope of the invention. Thus, it is intended that the present invention cover the modifications and variations of this invention provided they come within the scope of the appended claims and their equivalents.

Figure 2:
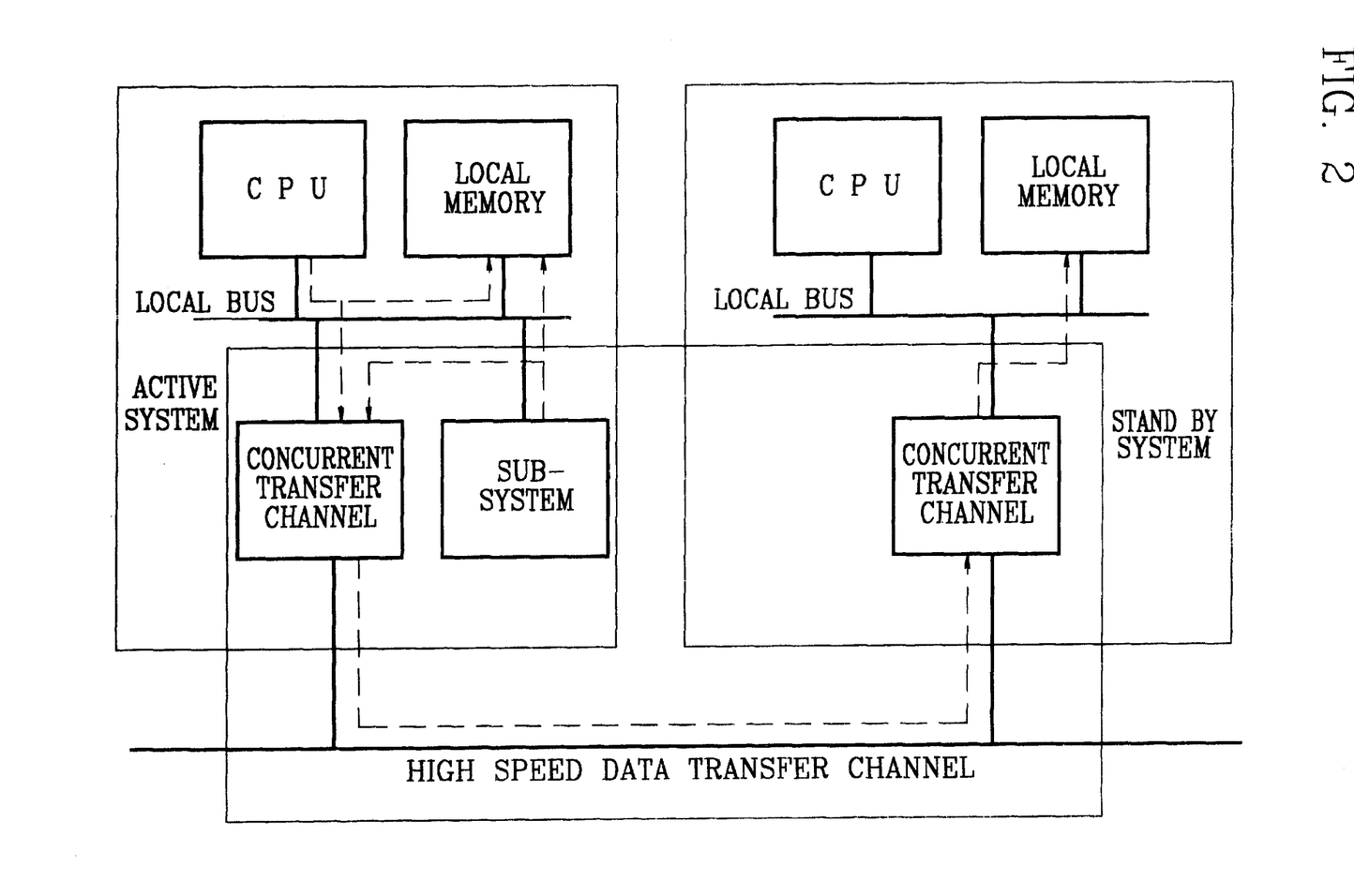
FIG. 2 is a schematic construction diagram of a high speed data transfer channel in an ATM switching system according to the present invention.

FIG. 2 is a schematic construction diagram of a high speed data transfer channel in an ATM switching according to the present invention.

Referring to FIG. 2, a concurrent transfer channel always monitors a bus. And, if the content of the local memory of the active mode system is changed by the CPU or a sub-system, for example, an IPC (Inter Processor Communication), a SCSI (Small Computer System Interface), an ethernet, and an input/output unit, the concurrent transfer channel stores the changed data in its own internal buffer. The stored data is transferred to the standby mode system from the active mode system through the high speed data transfer channel. The standby mode system receiving the data interferes the internal local bus, and if the standby mode system gets the bus, it accomplishes a writing operation into its own local memory. Once an efficient response to the writing operation is received from the local memory, the concurrent transfer channel of the standby mode system transfers a corresponding response to the active mode system. In this case, if there exists data to be continuously transferred, the concurrent transfer channel of the standby mode system may transfer the data through the same manner as the above.

The concurrent transfer channel of the active mode system latches, on an internal register, an address of the data to be transferred through the high speed data transfer channel. In this way, if an error is found, the processor of the active mode system accesses the interval register having the address where the error is found, and again performs the transmission. While the writing operation is executed into the local memory of the standby mode system through the high speed data transfer channel, if a memory writing operation is performed onto a local bus of the active mode system, the memory writing operation can be performed regardless of the operation of the high speed data transfer channel, thereby improving the capability of the system. And, if the error mentioned above is found, an error recovery mechanism is executed. As discussed above, when the CPU or the sub-system writes the data in the local memory of the active mode system, if a response to the writing operation is not received from the standby mode system, the high speed data transfer channel of the TDX-10 can not perform the next operation. Thereby, this has caused reduction in the capability of the system. However, the transfer apparatus according to the present invention includes a "first in first out" unit in the concurrent transfer channel. Thereby, when the CPU or the sub-system performs the writing operation into the local memory, the "first in first out" unit is operated regardless of the operation of the concurrent transfer channel. Therefore, the problem that arises in the prior art can be solved.

Figure 3:
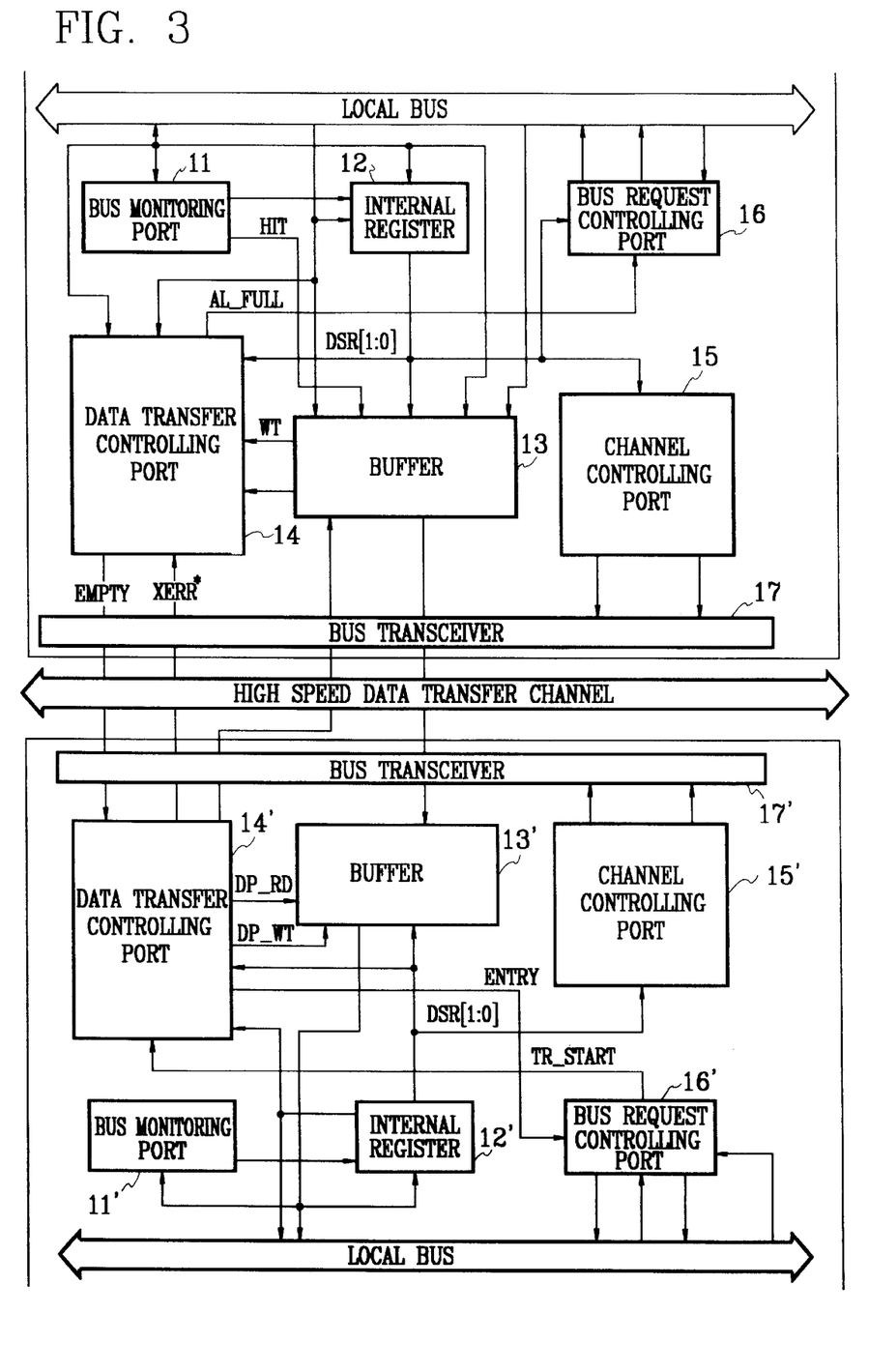
FIG. 3 is a block construction diagram of a high speed data transfer apparatus according to the present invention.

FIG. 3 is a block construction diagram of a high speed data transfer apparatus according to the present invention. In the drawings, reference numerals 11 and 11' indicate bus monitoring ports, reference numerals 12 and 12' internal registers, reference numerals 13 and 13' buffers, reference numerals 14 and 14' data transfer controlling parts, reference numerals 15 and 15' channel controlling ports; reference numerals 16 and 16' bus request controlling ports, and reference numerals 17 and 17' bus transceivers, respectively.

A main processor of the ATM switching system uses the CPU having a RISC (Reduced Instruction Set Computer) of high efficiency and also uses a synchronous high efficiency local bus of 40 Mhz as its own internal local bus. The function of each port is as follows.

The bus monitoring ports 11 and 11' monitor the bus so as to determine whether or not an operation in the local bus is transferred to the standby mode system from the active mode system through the high speed data transfer channel.

Internal registers of the concurrent transfer channel can be implemented by many different registers, such as an ISR (Interrupt Source Register), an IMR (Interrupt Mask Register), a DSR (Duplication Status Register), a CMR (Command Register), and a FAR (Fault Address Register).

The ISR has information on the cause of interruption generation. Therefore, if the CPU receives the interruption, information for interruption service can be obtained by accessing the ISR.

The IMR is used for masking the interruption.

The DSR is used for determining a mode of its own system or a mode of another party's system by means of the channel controlling port.

The CMR is used for controlling the concurrent transfer channel.

The FAR has an address where the error is found when data is transferred through the high speed data transfer channel.

Once the interruption is received by the processor, the ISR is confirmed. If the interrupt is generated by the error, a value of the FAR is read to again perform a corresponding operation.

Figure 5:
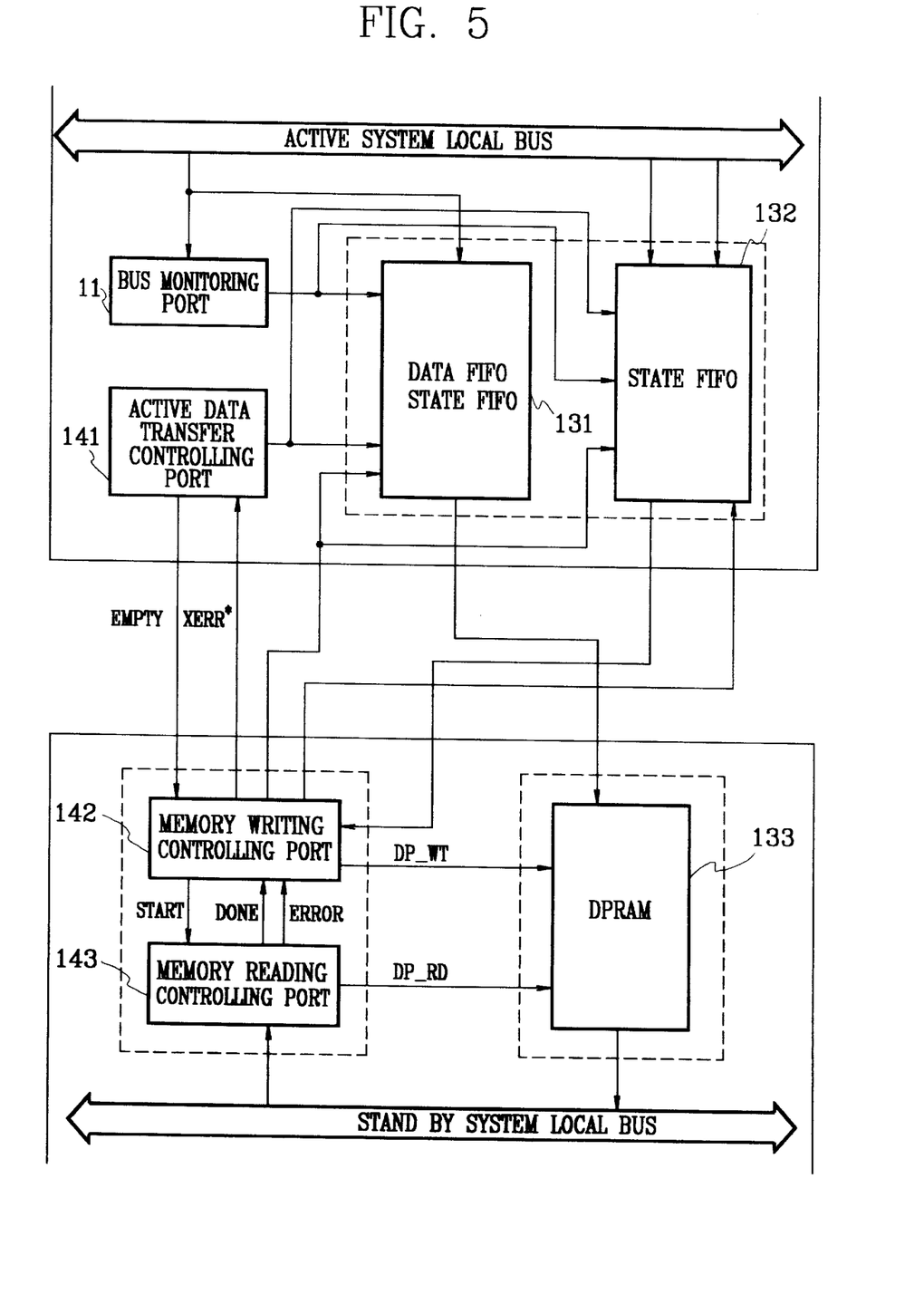
FIG. 5 is a diagram explaining an operation of a high speed data transfer apparatus according to the present invention.

The data transfer controlling ports 14 and 14' are subjected to transfer data in the active mode system but to the contrary, they are subjected to receive the data in the standby mode system, thereby controlling the writing operation into its own local memory. And, as shown in FIG. 5, an active data transfer controlling port 141 is operated in the active mode system. On the other hand, a memory writing controlling port 142 and a memory reading controlling port 143 are operated in the standby mode system.

The channel controlling port 15 and 15' determine whether its own system is of the active mode system or the standby mode system, and also determine whether or not the high speed data transfer channel is connected under such a situation that a fault is provided thereto.

The bus request controlling ports 16 and 16' receive bus requests received from the local bus and then selectively send the received requests to a local bus interfering unit.

Also, the bus request controlling port 16 and 16' are employed to reduce overhead that may arise owing to the bus interference in the standby mode system, and are subjected to operate in only the standby mode system.

The buffer units 13 and 13' buffer data to be transferred to the high speed data transfer channel. As shown in FIG. 5, the buffer units 13 and 13' are composed of data FIFO 131 for buffering the data generated from its own local bus in the active mode system, a state FIFO 132 for buffering information on the size of data and a corresponding response signal, and a DPRAM 133 for buffering, in the standby mode system, the content for one operation from the data FIFO 131 and the state FIFO 132 of the active mode system.

The bus monitoring port 11 decodes an address generated from its own local bus in the active mode system. Then, the bus monitoring part determines to buffer the decoded address into the data FIFO 131 and the state FIFO 132 of the buffer unit 13 and also determines whether the decoded address is used for accessing the internal register or not. If the buffering operation should be performed, the bus monitoring port outputs a signal "Hit" to the buffer unit 13 at the logic "high" level. However, on the other hand, if the above operation is under the access of the internal register, the bus monitoring port changes a level of a signal "register access" at the logic "high" level.

The internal register 12 which receives the register access signal at the logic "high" level, changes a value of the corresponding register through the data generated from the local bus, and outputs a response signal to the local bus to thereby complete an operation of the register.

The data FIFO receiving the signal "Hit" at the logic "high" level, further includes 1 bit, together with address/data of 64 bits in order to distinguish data from address. If the address is detected, the data FIFO is set as "0", but if the data is detected, it is set as "1". The state FIFO 132 buffers the size of the data and the response signal.

Through the buffered response signal, the memory writing controlling port 142 of the data transfer controlling port 14' reads the content of the state FIFO 132, and then checks the size of the data to be read from the data FIFO 131 and a possibility of an error generation.

Meantime, if there is buffered in the buffer unit 13 the data to be transferred to the standby mode system from the active mode system, the active data transfer controlling port 14 of the active mode system changes a level of a signal "empty" at the logic "low" level so as to inform the data transfer controlling port 14' of the standby mode system that there exists the data to be transferred. Further, the data transfer controlling port 14 of the active mode system compares a point value of a buffer reading signal READ with that of a writing signal WT from the buffer unit 13 so as to check whether the buffer unit 13 is full or not. In this case, if the difference between the two values arrives at a threshold value, it can be regarded that the buffer is full, so that the processor of the active mode system delays the writing operation into the memory.

In order to perform such an operation, if the difference between the two values of the writing and reading points arrives at the threshold value, the data transfer controlling port 14 of the active mode system changes the level of a signal "AL_FULL" at the logic "high" level. The bus request controlling port 16 of the active mode system which receives the signal "AL_FULL" at the logic "high" level, changes the level of a signal "bus request" at the logic "high" level. Further, if a signal "bus Grant" is input from the bus arbitration unit of the active mode system at the logic "high" level, the bus request controlling port 16 of the active mode system changes the level of the signal "bus busy" at the logic "high" level, so that it can use the bus during a predetermined time and permit the processor of the active mode system to delay the writing operation into the memory.

The memory reading controlling port 143 of the data transfer controlling port 14' of the standby mode system which receives the signal "empty" at the logic "low" level, reads an address, data, the size of the data, and a response of each piece of data of the high speed data transfer channel from the buffer unit 13 of the active mode system. Therefore, in order to perform such an operation, the data transfer controlling port 14' of the standby mode system changes the signal "READ" at the logic "high" level.

When the data transfer controlling port 14' of the standby mode system reads data from the active mode system, the data transfer controlling port 14', first reads the state information of the high speed data transfer channel from the state FIFO 132 of the active mode system. Then, if error is not found in the data stored in the data FIFO 131, the data transfer controlling port 14' outputs a writing signal "DP_WT" to the DPRAM 133 at the logic "high" level and then stores the data stored in the data FIFO 131 of the active mode system in the DPRAM 133.

However, if error is found in the data stored in the data FIFO 131 by checking the state information of the high speed data transfer channel read from the state FIFO 132 of the active mode system, the data transfer controlling port 14' of the standby mode system does not store the data in the DPRAM 133.

The data transfer controlling port 14' of the standby mode system where the data corresponding to one operation is buffered without error, outputs the signal "empty" to the bus request controlling port 16' at the logic "high" level so as to get a right for bus use.

The bus request controlling port 16' receiving the signal "empty" at the logic "high" level, changes a level of the signal "bus request" at the logic "high" level. And, if the signal "bus Grant" is received at the logic "high" level through the local bus interference, the bus request controlling port 16' changes a level of the signal "bus request" at the logic "high" level, thereby getting the right for local bus of the standby mode system.

If the right for bus use is given, the bus request controlling part 16' of the standby mode system changes a level of a signal "TR_START" at the logic "high" level in order to inform the data transfer controlling port 14' of the standby mode system that the writing operation can be performed into the local bus of the standby mode system.

The data transfer controlling port 14' of the standby mode system where the signal "TR_START" is received at the logic "high" level, writes the data buffered in its own buffer unit 13' into its own local memory. In the writing operation, if the signal "empty" is continuously received from the data transfer controlling port 14 of the active mode system at the logic "high" level without error, the data transfer controlling port 14' continuously executes the above operation until the level of the signal "empty" is changed to the logic "low" level. However, if the error is found during the writing operation, the data transfer controlling port 14' of the standby mode system informs the active mode system that the error is given through a line "XERR" so that the active mode system can perform the error recovery mechanism.

Figure 4:
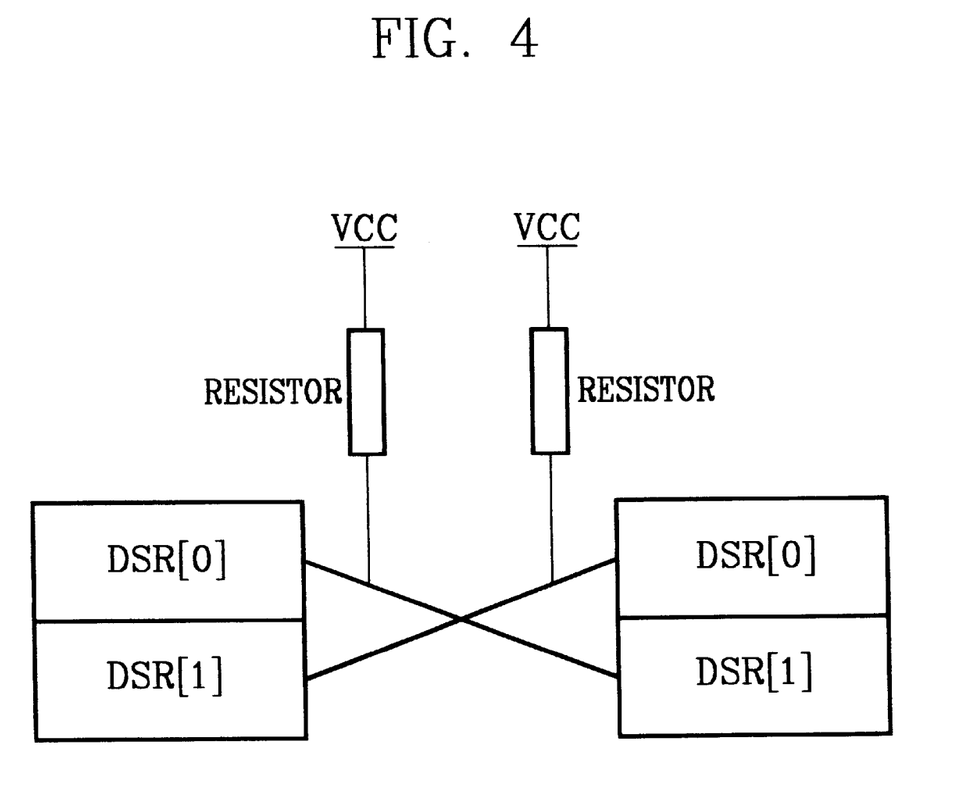
FIG. 4 is a construction diagram of a duplex mode determining circuit of a high speed data transfer apparatus according to the present invention.

FIG. 4 is a construction diagram of a duplex mode determining circuit of a high speed data transfer apparatus according to the present invention.

The DSR is used for determining whether its own system is under the active mode system or the standby mode system. As shown in FIG. 4, an initialization value of the DSR is maintained at "11". If the value of the DSR is maintained at "11" during loading of the system, the duplex mode determining circuit considers that the other system is under an idle mode, and changes the value of its own DSR to "01" thereby. Then, where the value of the DSR is changed to "01", the system is changed to the active state. But, the value of the DSR of the other system is changed to "10", so that the system is changed to the standby state. On the other hand, if both the systems are simultaneously changed to the active state and the value of the DSR is thus changed to "00", it is considered that the error is found in the system and an interruption process is performed. At this time, the high speed data transfer channel is disconnected.

FIG. 5 is a diagram explaining an operation of a high speed data transfer apparatus according to the present invention.

In FIG. 5, if the bus monitoring port 11 monitors that the writing operation into the local memory is performed on the local bus of the active mode system, the data FIFO 131 buffers the address/data of 64 bits. At the moment, the bus monitoring port 11 of the active mode system changes the level of the signal "Hit" at the logic "high" level from the logic "low" level so as to inform that there exists the address/data to be transferred to the data FIFO 131 and the state FIFO 132 through the high speed data transfer channel.

The data FIFO 131 is implemented by another FIFO having the width of 65 bits. 64 bits of 65 bits are mainly used for buffering address and data. Most significant bit 1 is used for discriminating the buffered address from the buffered data. In this case, if the bit is set as "0", the content of least significant bit 64 is address, but if the bit is set as "1", the content is data.

If the content buffered in the data FIFO 131 indicates address, the state FIFO 132 writes information on the size of data. To the contrary if the content buffered therein indicates data, the state FIFO 132 writes a responses to each piece of data.

Meanwhile, the state FIFO 132 and data FIFO 131 are constructed by FIFO having a dual port so that the writing operation into the local memory is performed on the local bus of the active mode system, regardless of the high speed data transfer channel. If there exists the data buffered in the data FIFO 131 of the active mode system, the data transfer controlling part of the active mode system changes the level of the signal "empty" at the logic "low" level, the signal "empty" being used for informing that there exists data to be transferred.

The memory writing controlling port 142 of the standby mode system reads the state FIFO 132 of the active mode system and then checks the size of the data stored in the data FIFO 131. Then, the memory writing controlling port 142 also checks whether an error is found or not.

The size of the data read from the state FIFO 132 is reduced by "1" whenever the data is read from the data FIFO 131. If a value of the data is given as "0", it is considered that all the corresponding data are read from the FIFO 131. In case that the content of one operation is stored in the DPRAM 133 without error, the memory writing controlling port 142 changes a level of a signal "Start" at the logic "high" level, the signal being used for directing the memory reading controlling port to start an operation.

The memory reading controlling port 132 outputs the signal "DP_RD" to the DPRAM 133 at the logic "high" level and also outputs the data stored in the DPRAM 133 to the local bus of the standby mode system.

If the writing operation onto the local bus of the standby mode system is completed without error, the level of a signal "Done" is changed at the logic "high" level.

The memory writing controlling port 142 where the signal "Done" is received reads the content for next operation from the state FIFO 132 and the data FIFO 131 under such a situation that the signal "empty" is at the logic "low" level. And, the memory writing controlling port 142 performs again the above operation until the signal "empty" is changed to the logic "high" level.

When the writing operation is performed through the high speed data transfer channel, if the error is generated, the memory reading controlling port 143 changes a level of a signal "Error" at the logic "high" level. The memory writing controlling port 142 where the signal "Error" is received at the logic "high" level, outputs a signal "XERR" to the active mode system at the logic "low" level, the signal being used for informing that the error is found in the high speed data transfer channel.

The active mode system receiving the signal "XERR" from the standby mode system generates interruption through the processor of the active mode system.

The processor of the active mode system where the signal "XERR" is received from the standby mode system at the logic "low" level, generates interruption.

The processor of the active mode system reads a value of the FAR among the internal registers and begins to retransfer from the address recorded in the FAR.

Figure 6:
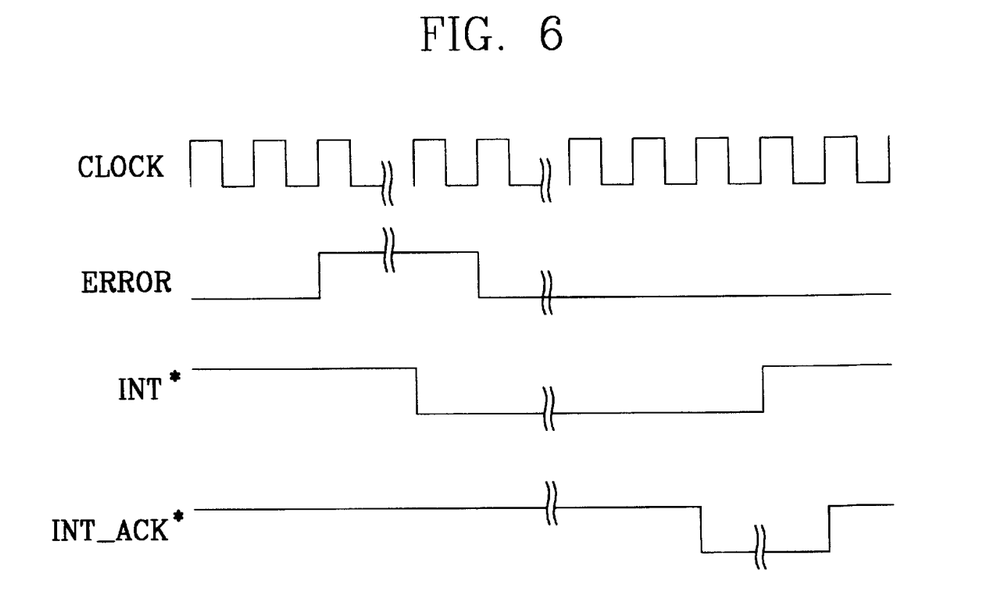
FIG. 6 is a control timing diagram illustrating an error generation in a high speed data transfer apparatus according to the present invention.

FIG. 6 is a control timing diagram illustrating an error generation in a high speed data transfer apparatus according to the present invention.

Figure 7:
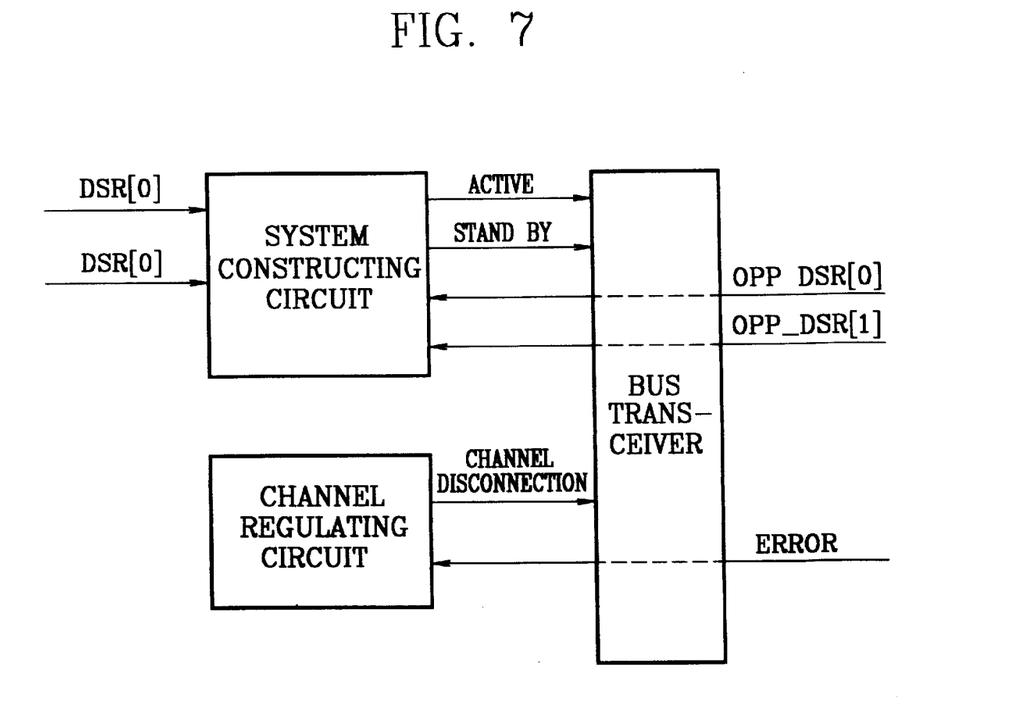
FIG. 7 is a detailed construction diagram of a channel controlling port according to the present invention.

FIG. 7 is a detailed construction diagram of a channel controlling port according to the present invention.

Referring to FIG. 7, the value of the initialization DSR [1:0] of the duplicate mode is maintained at "11", i.e., the idle state, the but transceivers 17 and 17' are toward a direction for inputting data. After power comes in and the program is stated, the system compares the value of its own DSR[1:0] with a value OPP_DSR[1:0] of another DSR [1:0]. In the comparison, if the value OPP_DSR[1:0] is received at "11", the system changes the value of its own DSR[1:0] to "01" and thereby changes its own mode to the active mode system.

At this moment, a system constructing circuit 151 changes a level of the active signal at the logic "high" level. If the value of the OPP_DSR[1:0] is received at "10", the system constructing circuit 151 considers that the other system has already been changed to the active mode system. Thus, the system constructing circuit 151 is changed to the standby mode system. And, at the moment, a level of the standby signal is changed at the logic "high" level. Here, if both the systems are changed to the active mode systems, this means that the error is given in the system. Thus, the system is changed to an error mode and the program is reloaded, thereby determining the mode of the system. At this time, the levels of the active and the standby signals are all changed at the logic "low" level and the direction of the bus transceiver is the same as that of the idle state.

After determining the mode of the system based on the above manner, if the error is received from the standby mode system during the reception or transmission of data, a channel regulating circuit 152 understands that any fault exists in the system, and changes a level of a channel disconnection signal at the logic "high" level to thereby change the state of the bus transceiver 17 to a state "Tri-state". Thus, the system is constantly driven under a disconnection state "Stand-Alone" of the high speed data transfer channel until the fault between both the systems is eliminated. This means that the system itself isolates the fault so as to prevent its own malfunction which could be generated due to fault of the other system. This is very important to the system having a fault tolerance function.

There is shown in <Table 1> the stat of the system according to the DSR.

TABLE 1

| DSR | The state of the system |
|---|---|
| 00 | Error of the system |
| 01 | Active mode system |
| 10 | Standby mode system |
| 11 | IDLE |

Figure 8:
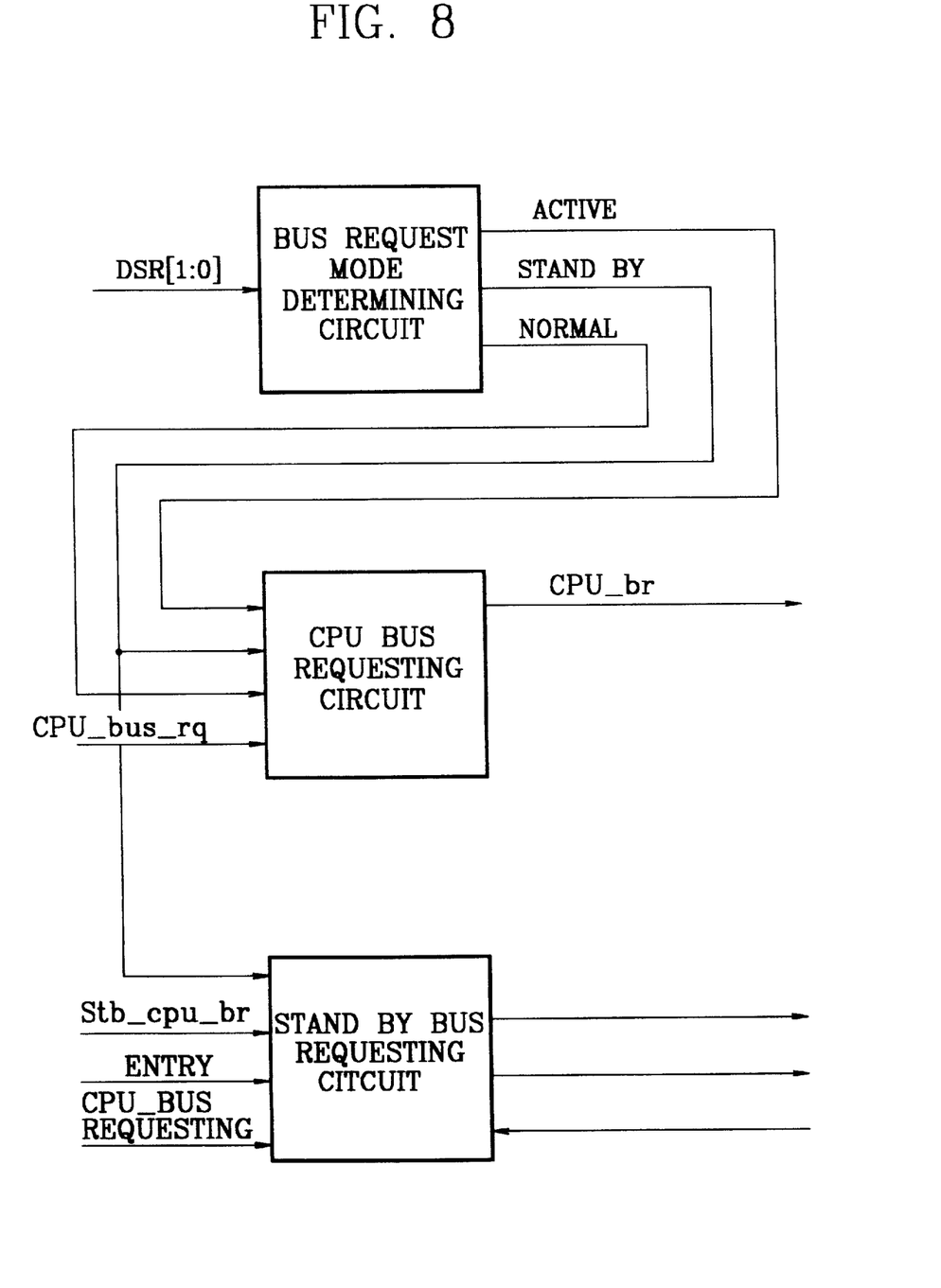
FIG. 8 is a detailed construction diagram of a bus request controlling port according to the present invention.

FIG. 8 is a detailed construction diagram of a bus request controlling port according to the present invention.

Referring to FIG. 8, a bus request mode determining circuit 161 decodes the value of the DSR[1:0] from the internal register and checks whether the mode of its own system is a normal state or not. As shown in <Table 1>, if the value of the DSR[1:0] is at "01", the bus request mode determining circuit 161 regards its own system as the active mode system and changes the active signal at the logic "high" level. On the other hand, if the value of the DSR[1:0] is at "10", the bus request mode determining circuit 161 regards its own system as the standby mode system and changes the standby signal at the logic "high" level. And, if the rest values are received, the bus request mode determining circuit 161 maintains the level of the normal signal at the logic "high" level.

In the meantime, the bus request controlling port 16 can request the bus. Here are two cases in which one called "CPU_br" is requested from the high speed data transfer channel of the CPU and the other called "bus use request" is requested in writing data received from the high speed data transfer channel in its own local memory.

If the CPU enables "CPU_bus_rq" at "H" in order to request the bus, the CPU bus requesting circuit 162 which receives the signal, and determines whether or not it bypasses the CPU bus request by means of its own local bus. If it is at the active state or the normal state, the CPU bus requesting circuit bypasses the CPU bus request. However, on the other hand, if it is at the standby state, the CPU bus requesting circuit delays the CPU bus request so that the bus use priority is provided to the concurrent transfer channel, since nothing is performed in the standby mode system, except that the standby mode system prevents watch-dog timeout by accessing periodically a particular register. Thereby, even though an urgent hindrance, i.e., power goes out, may arise, it is possible to transfer the data to the standby mode system from the active mode system within a given time by reducing bus waste through the bus interference.

In case that a standby mode system bus request signal "Stb_cpu_br" is input to the standby bus requesting circuit 163 so that the standby mode system uses its own local bus, the standby bus requesting circuit 163 outputs the bus use request signal to the local bus.

The local bus interfering unit receiving the bus use request signal outputs the bus use allowance signal to the standby bus requesting circuit 163 at the logic "high" level through the interference algorithm, if the local bus is allowed to be used therein. The standby bus requesting circuit 163 outputs the bus use signal at the logic "high" level when the bus use allowance signal is input at the logic "high" level.

Also, in case that the CPU_bus request signal is input, the standby bus requesting circuit 163 changes the level of the bus use signal at the logic "low" level so as to prevent the watch-dog timeout and then offers the bus right to the CPU.

As mentioned above, the present invention is subjected to extend the system bus so that the processor of the active mode system directly writes resources in the memory of the standby mode system. Further, when it is necessary to maintain, at the same level, the content of data of both the active and standby mode systems, the present invention enables the data to be simultaneously written even in the memory of the standby mode system as well as the memory of the active mode system without having particular software. Thereby, there is provided in the present invention an efficiency in that the switching system is improved in its capability.

What is claimed is:

1. A high speed data transfer apparatus comprising:

a bus monitoring unit for decoding an address stored in a local bus and outputting a signal to access data stored in an internal register and a control signal to buffer input data;

a first storing unit for storing a cause of an interruption generation, duplex mode determining data, and an address of the data to be transferred, said first storing unit being controlled by said bus monitoring unit;

a second storing unit for storing data and state information of said data input from said local bus under control of said bus monitoring unit during an active mode system, and temporarily storing data transferred from said active mode system during a standby mode system;

a data transfer controlling unit for outputting a signal to said standby mode system during said active mode system, and during said standby mode system, reading data and said data information stored in said second storing unit of said active mode system, storing said read contents in said second storing unit of said standby mode system, and transferring a right to a bus use through said local bus of said standby mode system, said signal being used for informing that there exists data to be transferred;

a channel controlling unit for determining a transfer direction of said bus according to said duplex mode, and controlling said bus so as to disconnect a transfer channel when error is found; and a bus request controlling unit for requesting said right to local bus use under control of said data transfer controlling unit.

2. The high speed data transfer apparatus as claimed in claim 1, wherein said first storing unit comprises:

a register for storing information on said cause of said interruption generation;

a register for masking said interruption;

a state register for determining said active mode system or said standby mode system;

a register for storing control information; and a register for storing an address where error is generated during the transmission of data.

3. The high speed data transfer apparatus as claimed in claim 2, wherein said state register initialization value of which is maintained at "11", stores "01" in case that its own mode is of said active mode system, but storing "10" in case that its own mode is of said standby mode system.

4. The high speed data transfer apparatus as claimed in claim 1, wherein said second storing unit comprises:
- a data FIFO (First In First Out) for storing address and data to be input from said local bus of said active mode system under control of said bus monitoring unit, and outputting data stored by a reading signal of said data transfer controlling unit of said standby mode system;
- a state FIFO for storing state information of said data to be input from said local bus of said active mode system under control of said bus monitoring unit, and outputting data stored by a reading signal of said data transfer controlling unit of said standby mode system; and
- a dual port DPRAM for storing data transferred from said data FIFO under control of said data transfer controlling unit of said standby mode system.

5. The high speed data transfer apparatus as claimed in claim 4, wherein said data FIFO is composed of 65 bits 64 bits of which are used for buffering address or data, and most significant 1 bit of which is used for checking whether said buffered contents are addresses or data.

6. The high speed data transfer apparatus as claimed in claim 4, wherein said data FIFO and said state FIFO are implemented by another FIFO having a dual port so that a writing operation on said local bus of said active mode system is capable of being performed regardless of said high speed data transfer channel.

7. The high speed data transfer apparatus as claimed in claim 4, wherein said data transfer controlling unit comprises:
- an active data transfer controlling unit for outputting a signal to inform said standby mode system that there exists data to be transferred to said standby mode system from said active mode system, and in case that an error signal is input from said standby mode system, clearing said data FIFO and said state FIFO;
- a memory writing controlling unit for reading said state information stored in said state FIFO of said active mode system, in case that there is input a signal to inform that there exists data to be transferred from said active data transfer controlling unit of said active mode system, for storing said data stored in said data FIFO in case that error is not found, and for outputting a start signal through said local bus of said standby mode system, said start signal being used for transferring data stored in said duplex port DPRAM; and
- a memory reading controlling unit for outputting a signal to request use of said bus to said bus request controlling unit in case that said start signal is input from said memory writing controlling unit, and outputting reading data stored in said dual port DPRAM through said local bus of said standby mode system when the use of said local bus is allowed, informing said standby mode system of the generation of error, if found, and outputting a transfer complete signal to said memory writing controlling unit.

8. The high speed data transfer apparatus as claimed in claim 7, wherein said channel controlling unit comprises:
- a unit for inputting said data stored in said state register of said first storing unit and then controlling said active/standby mode system of said bus; and
- a channel regulating unit for outputting a channel disconnection signal to control a transfer direction of said bus when said error signal is received from another mode through said bus.

9. The high speed data transfer apparatus as claimed in claim 8, wherein said bus request controlling unit comprises:
- a bus request mode determining unit for controlling said active mode system, said standby mode system, and a normal mode under input of said data stored in said state register of said first storing unit;
- a CPU bus requesting unit for passing a CPU bus request signal by inputting a local bus use request signal from said CPU in case that an input mode from said bus request mode determining unit is of said active mode system, or of said normal mode; and
- a standby bus requesting unit for outputting said CPU bus request signal before the generation of watch-dog timeout after said CPU bus request signal is received from outside and is then delayed during a predetermined threshold value, and for informing said memory reading controlling unit that a bus use allowance signal is input by receiving a bus request signal from said memory reading controlling unit of said standby mode system.

* * * * *